United States Patent
Kitanaka et al.

(10) Patent No.: US 9,221,346 B2
(45) Date of Patent: Dec. 29, 2015

(54) PROPULSION CONTROL APPARATUS FOR ELECTRIC MOTOR CAR

(75) Inventors: Hidetoshi Kitanaka, Tokyo (JP); Toshiaki Takeoka, Tokyo (JP); Keita Hatanaka, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 981 days.

(21) Appl. No.: 13/375,702

(22) PCT Filed: Jul. 5, 2010

(86) PCT No.: PCT/JP2010/061415
§ 371 (c)(1),
(2), (4) Date: Dec. 1, 2011

(87) PCT Pub. No.: WO2011/007695
PCT Pub. Date: Jan. 20, 2011

(65) Prior Publication Data
US 2012/0086369 A1  Apr. 12, 2012

(30) Foreign Application Priority Data

Jul. 15, 2009  (JP) .................. PCT/JP2009/062813

(51) Int. Cl.
*H02P 3/14* (2006.01)
*B60L 7/16* (2006.01)
(Continued)

(52) U.S. Cl.
CPC ... *B60L 7/16* (2013.01); *H02J 1/12* (2013.01); *H02J 7/045* (2013.01); *B60L 2200/26* (2013.01); *H02M 7/797* (2013.01)

(58) Field of Classification Search
CPC ..... B60W 10/08; B60W 10/26; B60W 20/00; Y02T 10/7005
See application file for complete search history.

(56) References Cited

U.S. PATENT DOCUMENTS

| | | | |
|---|---|---|---|
| 6,560,130 B2 * | 5/2003 | Oba et al. ................. | 363/97 |
| 2006/0290318 A1 | 12/2006 | Toda et al. | |

(Continued)

FOREIGN PATENT DOCUMENTS

| | | | |
|---|---|---|---|
| CN | 1865038 | * | 11/2006 |
| CN | 1865038 A | | 11/2006 |

(Continued)

OTHER PUBLICATIONS

English translation of JP-2003-199204,A.*

(Continued)

*Primary Examiner* — Shawki S Ismail
*Assistant Examiner* — Zoheb Imtiaz
(74) *Attorney, Agent, or Firm* — Buchanan Ingersoll & Rooney PC

(57) ABSTRACT

A propulsion control apparatus for an electric motor car includes: an inverter apparatus connected to a DC power supply; a motor connected to an output of the inverter apparatus; a converter apparatus connected to an input of the inverter apparatus; and a power storage apparatus connected to an output of the converter apparatus, is configured to charge/discharge a part of power running power or regenerative power of the motor to/from the power storage apparatus. The converter apparatus includes a converter control unit that generates, based on a regeneration state signal as a signal indicating a suppression state of the regenerative power or regenerative torque or regenerative current equivalent to the regenerative power, a charging current command value, generates a charging and discharging current command value of the converter apparatus based on the charging current command value, and performs control.

16 Claims, 9 Drawing Sheets

(51) Int. Cl.
  *H02J 1/12*   (2006.01)
  *H02J 7/04*   (2006.01)
  *H02M 7/797*  (2006.01)

(56) References Cited

U.S. PATENT DOCUMENTS

| | | | | |
|---|---|---|---|---|
| 2007/0080659 | A1* | 4/2007 | Urakabe et al. | 318/599 |
| 2007/0182361 | A1* | 8/2007 | Pande et al. | 318/812 |
| 2009/0271056 | A1* | 10/2009 | Kitanaka | 701/22 |

FOREIGN PATENT DOCUMENTS

| | | | |
|---|---|---|---|
| JP | 2002-305803 A | | 10/2002 |
| JP | 2003-199204 A | | 7/2003 |
| JP | 2003-199204 | * | 11/2003 |
| JP | 2003-199204 A | * | 11/2003 |
| JP | 2005-278269 A | | 10/2005 |
| JP | 2006-14489 A | | 1/2006 |
| JP | 2006-246700 A | | 9/2006 |
| JP | 2007-20370 A | | 1/2007 |
| JP | 2007-104899 A | | 4/2007 |
| JP | 2008-29149 A | | 2/2008 |
| JP | 2008-141849 A | | 6/2008 |
| JP | 2008-141877 A | | 6/2008 |

OTHER PUBLICATIONS

English translation of CN-1865038.*
International Search Report (PCT/ISA/210) issued on Sep. 21, 2010, by Japanese Patent Office as the International Searching Authority for International Application No. PCT/JP2010/061415.
Written Opinion (PCT/ISA/237) issued on Sep. 21, 2010, by Japanese Patent Office as the International Searching Authority for International Application No. PCT/JP2010/061415.
Korean Office Action (Notice of Preliminary Rejection) dated May 29, 2013, issued by the Korean Intellectual Property Office in corresponding Korean Patent Application No. 10-2011-7031673, and an English translation. (20 pgs.).
Office Action issued on Oct. 10, 2013, by the Chinese Patent Office in corresponding Chinese Patent Application No. 201080031578.3 and an English Translation of the Office Action. (46 pages).

* cited by examiner

PROPULSION CONTROL APPARATUS FOR ELECTRIC MOTOR CAR

FIELD

The present invention relates to a propulsion control apparatus for an electric motor car to which a power storage device such as a secondary battery or an electric double layer capacitor is applied.

BACKGROUND

In general, an electric motor car is configured to receive electric power from an overhead wire with a current collector, drive a motor with a power converter such as an inverter apparatus using the received power, and travel. When a car is braked, a so-called regenerative brake that regeneratively drives the motor to obtain braking force is used. Regenerative power generated at this point is supplied to loads of other cars present near the own car via the overhead wire, a third rail, or the like and consumed in the loads.

However, in the early morning or at night or in a quiet railroad section with a small number of trains in service, in some case, no other cars are present near the own car and the regenerative power generated by the own car is not sufficiently consumed. When the regenerative power of the own car is larger than electric power consumed by other cars, an overhead wire voltage rises. It is likely that various apparatuses connected to the overhead wire are damaged.

Therefore, the inverter apparatus mounted on the electric motor car includes a voltage detector that detects the overhead wire voltage or the like (the overhead wire voltage or a filter capacitor voltage, for example, on an input side of the inverter apparatus equivalent to the overhead wire voltage). When the overhead wire voltage or the like rises and exceeds a predetermined value, the inverter apparatus performs control for suppressing regenerative braking force to suppress the generation of the regenerative power and operates to prevent the overhead wire voltage or the like from rising to a specified value or more. At this point, braking force of the car in which the regenerative braking force is suppressed and insufficient is supplemented by a mechanical brake configured to press a brake shoe against a wheel or a brake disk. Brake energy (kinetic energy) of the car changes to heat and is radiated to the atmosphere. In such a case, there is a problem in that the brake energy that should originally have been able to be used in the loads of the other cars is wasted and wear of the brake shoe of the mechanical brake occurs.

In recent years, performance of power storage devices such as a secondary battery and an electric double layer capacitor is improved. Therefore, a power storage system is developed in which the power storage devices are mounted on an electric motor car and excess regenerative power, for example, during braking without a sufficient regenerative load is stored in the power storage devices and reused during power running.

This power storage system includes a converter apparatus that performs DC-DC conversion and a power storage apparatus including a power storage device such as a secondary battery or an electric double layer capacitor. In general, a method of charging and discharging the power storage device is configured to control charging and discharging currents to the power storage apparatus via the converter apparatus.

As an example of such a power storage system, for example, a related art disclosed in Patent Literature 1 is a technology for mounting an electric double layer capacitor on a car and, making use of a phenomenon in which an overhead wire voltage or a filter capacitor voltage rises during regenerative braking when no other trains as regenerative loads are present near the own car, when a detection value of the filter capacitor voltage exceeds a predetermined value, generating an absorption current command to a power storage device according to an excess amount and performing control of a converter apparatus to collect and store excess regenerative power during an overhead wire voltage rise in the electric double layer capacitor, and discharging the regenerative power during the next power running to realize reuse of regenerative energy.

CITATION LIST

Patent Literature

Patent Literature 1: Japanese Patent Application Laid-open No. 2003-199204

SUMMARY

Technical Problem

The related art disclosed in Patent Literature 1 is configured to control a charging current to the power storage apparatus based on a detection value of an overhead wire voltage or a filter capacitor voltage input to a control unit of the converter apparatus. However, in this case, there are problems explained below.

1. When voltage detectors that detect an overhead wire voltage or a filter capacitor voltage are respectively provided in the inverter apparatus and the converter apparatus, an error occurs between an overhead wire voltage or a filter capacitor voltage detected by the inverter apparatus and an overhead wire voltage or a filter capacitor voltage detected by the converter apparatus because of a detection error between the voltage detectors. For example, in a voltage detector that can detect general 1500 volts as an overhead wire voltage of an electric railroad, because a detection tolerance is about 3%, a detection error of about ±45 volts occurs.

In this case, even in a state in which the voltage detector provided in the inverter apparatus determines that a rise in the overhead wire voltage or the filter capacitor voltage exceeds a predetermined value and performs control for suppressing regenerative braking force, in some case, the overhead wire voltage or the filter capacitor voltage detected by the voltage detector provided in the converter apparatus does not reach the predetermined value. Therefore, the converter apparatus does not perform collection of regenerative power to the power storage apparatus. As a result, a state in which the regenerative braking power is insufficient continues and the mechanical brake operates.

2. When a plurality of inverter apparatuses and power storage systems (power storage apparatuses and converter apparatuses) are present in a train formation, there is an error among detection values of voltage detectors. Therefore, when an overhead wire voltage or the like rises and exceeds the predetermined value during regenerative braking, absorption power to the power storage devices of the converter apparatuses fluctuates and operation states (energization current values) of the converter apparatuses vary. In other words, even under a condition such as the same overhead wire voltage or the like (overhead wire voltage or filter capacitor voltage), the converter apparatus including the voltage detector that detects an overhead wire voltage or the like rather low has small absorption power to the power storage apparatus and the converter apparatus including the voltage detector that detects an overhead wire voltage or the like rather high has large absorption power to the power storage apparatus. When the fluctuation occurs in the operation states of the converter apparatuses and the power storage apparatuses in this way, a problem such as shortened life of an apparatus that is often in an operation state occurs.

The present invention has been devised in view of the above and it is an object of the present invention to obtain a propulsion control apparatus for an electric motor car to which a power storage device such as a secondary battery or an electric double layer capacitor is applied, the propulsion control apparatus for an electric motor car being capable of efficiently performing collection of regenerative power generated during regenerative braking to a power storage apparatus and capable of suppressing, even when a plurality of inverter apparatuses, converter apparatuses, and power storage apparatuses are present in a train formation, fluctuation in operation states of the converter apparatuses and the power storage apparatuses.

Solution to Problem

In order to solve the aforementioned problems, a propulsion control apparatus for an electric motor car according to one aspect of the present invention is constructed in such a manner as to include: an inverter apparatus connected to a DC power supply; a motor connected to an output of the inverter apparatus; a converter apparatus connected to an input of the inverter apparatus; and a power storage apparatus connected to an output of the converter apparatus, the propulsion control apparatus for an electric motor car being configured to discharge a part of power running power or regenerative power of the motor from the power storage apparatus or charge a part of the power running power or the regenerative power in the power storage apparatus, wherein the converter apparatus includes a converter control unit that generates, based on a regeneration state signal as a signal indicating a suppression state of the regenerative power or regenerative torque or regenerative current equivalent to the regenerative power, a charging current command value, which is a command value of an electric current with which the converter apparatus charges the power storage apparatus, generates a charging and discharging current command value of the converter apparatus based on the charging current command value, and performs control.

Advantageous Effects of Invention

According to the present invention, the propulsion control apparatus includes the converter control unit that generates, based on a regenerative torque suppression amount indicating a state of regenerative torque or a state of regenerative power of the motor, a charging current command value with which the converter apparatus charges the power storage apparatus, and generates, based on the charging current command value, a charging and discharging current command value for the converter apparatus, and performs control. Therefore, there is an effect that, in a propulsion control apparatus for an electric motor car to which a power storage device such as a secondary battery or an electric double layer capacitor is applied, it is possible to efficiently perform collection of regenerative power generated during regenerative braking to a power storage apparatus and suppress, even when a plurality of inverter apparatuses, converter apparatuses, and power storage apparatuses are present in a train formation, fluctuation in operation states of the converter apparatuses and the power storage apparatuses.

DESCRIPTION OF EMBODIMENTS

Embodiments of a propulsion control apparatus for an electric motor car according to the present invention are explained in detail below based on the drawings. The present invention is not limited by the embodiments.

First Embodiment

Figure 1:
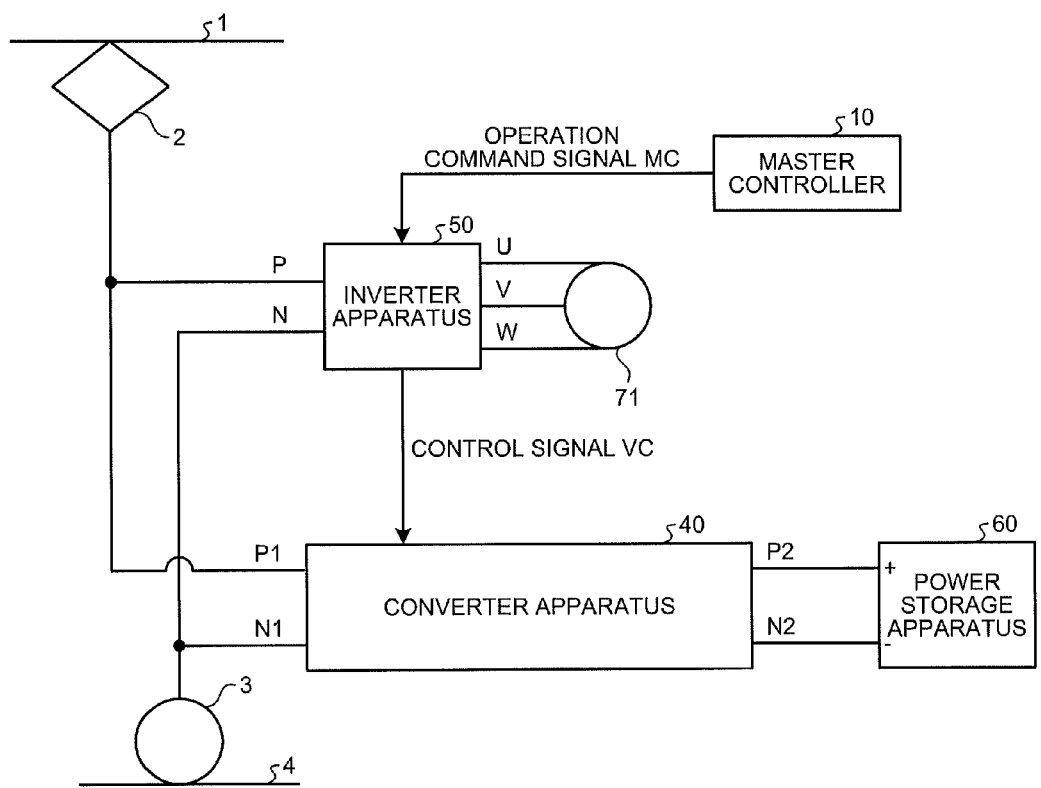
FIG. 1 is a diagram of a configuration example of a propulsion control apparatus for an electric motor car in a first embodiment of the present invention.

FIG. 1 is a diagram of a propulsion control apparatus for an electric motor car in a first embodiment of the present invention. As shown in FIG. 1, electric power from a not-shown substation is input to a positive side terminal P of an inverter apparatus (hereinafter simply referred to as "inverter") 50 and a positive side terminal P1 of a converter apparatus (hereinafter simply referred to as "converter") 40 from an overhead wire 1 via a current collector 2. Negative side currents from the inverter 50 and the converter 40 are connected to a rail 4 through respective terminals N and N1 thereof via a wheel 3 and return to a negative side of the not-shown substation.

The converter 40 includes DC output terminals P2 and N2. A power storage apparatus 60 is connected to the DC output terminals P2 and N2. The power storage apparatus 60 is configured by connecting a plurality of power storage devices such as secondary batteries or electric double layer capacitors in series and parallel to obtain a desired voltage and desired capacitance. Because a specific configuration of the power storage apparatus 60 is publicly known, the detailed explanation of the configuration is omitted.

The inverter 50 includes AC output terminals U, V, and W. A motor 71 is connected to the AC output terminals U, V, and W. The motor 71 is an AC motor. A three-phase induction motor or a synchronous motor is suitable as the motor 71. The wheel 3 is driven by the motor 71 to cause the electric motor car to travel.

A master controller 10 provided in a driver's cab (not shown) of the electric motor car is an apparatus with which a driver of the electric motor car performs setting of commands to the inverter apparatus and the like to adjust acceleration and deceleration. An operation command signal MC from the master controller 10 is input to the inverter 50. The operation command signal MC includes commands concerning power running acceleration, on and off of a brake, and the strength of the on and off of the brake of the electric motor car. The inverter 50 controls the torque of motor 71 based on the operation command signal MC.

A control signal VC is output from the inverter 50 to the converter 40. The control signal VC is a signal including a regenerative torque suppression amount (hereinafter simply referred to as "suppression amount") VDTELM that is an amount indicating a suppression state of regenerative torque or a suppression amount of regenerative power and is a regeneration state signal, speed VEL of the electric motor car (which can be an output frequency of the inverter 50, the number of revolutions of the motor 71, etc.), a power running regeneration state signal (an inverter state signal) PBC that is a signal indicating whether the inverter 50 is in a power running control state or a regenerative brake state, an input current ISV of the inverter 50, and an overhead wire voltage ESV of the inverter 50. Details concerning the control signal VC and functions of the control signal VC are explained later.

Figure 2:
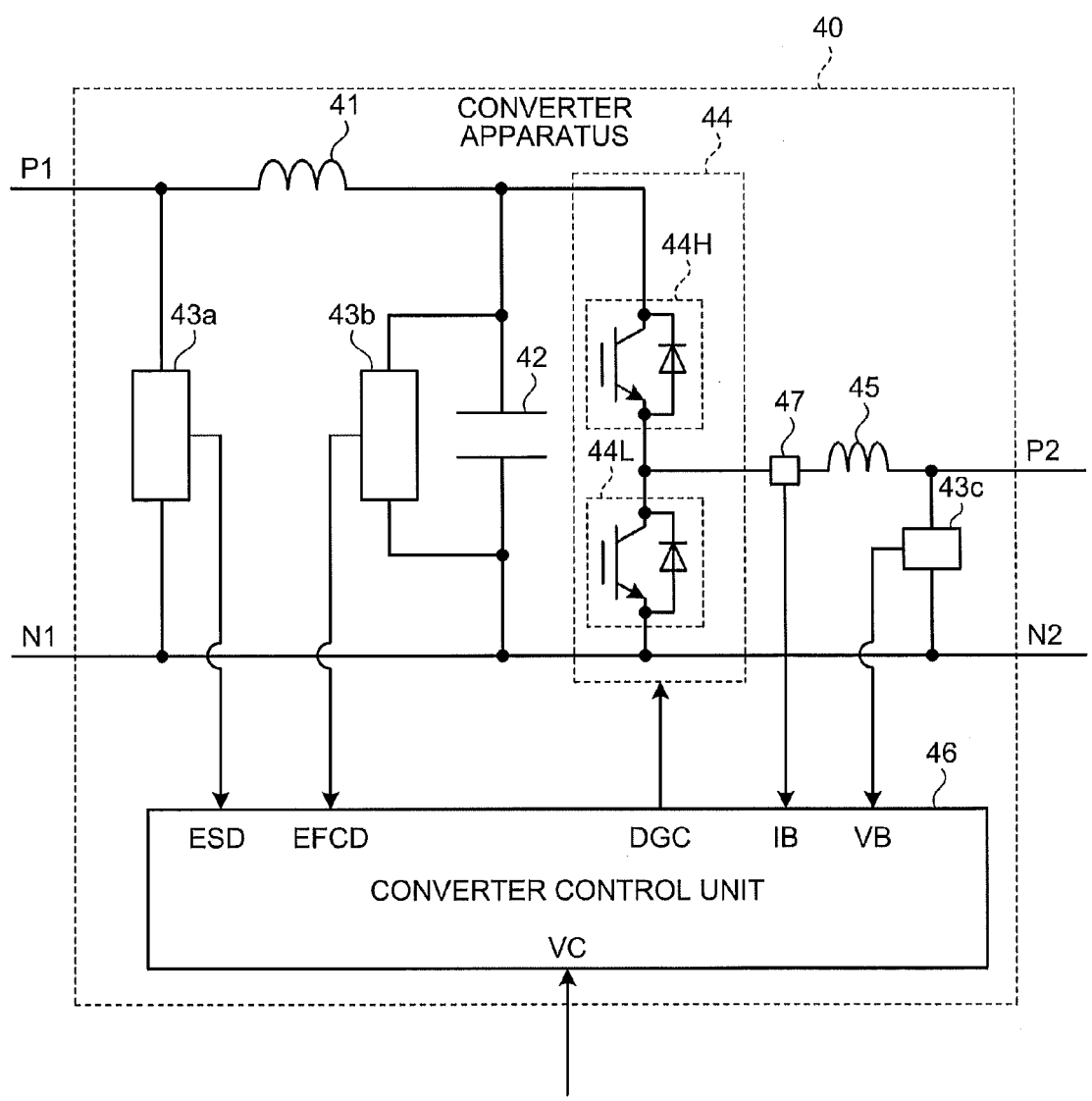
FIG. 2 is a diagram of a configuration example of a converter apparatus in the first embodiment of the present invention.

The configuration of the converter 40 is explained. FIG. 2 is a diagram of a configuration example of the converter 40 in the first embodiment of the present invention. As shown in FIG. 2, electric power from the current collector 2 is input to the input terminals P1 and N1. A reactor 41 is connected to the input terminal P1. A filter capacitor (hereinafter simply referred to as "capacitor") 42 is connected to the post stage of the reactor 41.

An LC filter circuit including the reactor 41 and the capacitor 42 suppresses a noise current generated by a switching operation of switching elements explained later from flowing out to the overhead wire 1 and smoothes a ripple component included in the voltage of the overhead wire 1 (an overhead wire voltage) to smooth a both-end voltage of the capacitor 42.

A both-end voltage of the input terminals P1 and N1 (=an overhead wire voltage) is detected by a voltage detector 43*a* and input to a converter control unit 46 as an overhead wire voltage detection value ESD. The both-end voltage of the capacitor 42 is detected by a voltage detector 43*b* and input to the converter control unit 46 as a capacitor voltage detection value (hereinafter simply referred to as "voltage detection value") EFCD.

A converter circuit 44 is connected to both ends of the capacitor 42. The converter circuit 44 includes switching elements 44H and 44L. The switching elements are subjected to ON/OFF control (switching control) by an ON/OFF signal DGC from the converter control unit 46. The converter circuit 44 is a so-called bidirectional step-down chopper circuit and has a step-down function for stepping down the voltage EFCD according to switching control by the switching elements 44H and 44L and outputting the voltage EFCD and a current control function for adjusting an output current as desired. Because the configuration and the operation of the converter circuit 44 are publicly known, explanation of the configuration and the operation is omitted.

At the output of the converter circuit 44, a current detector 47 that detects an output current and outputs the output current as a converter output current IB, a smoothing reactor 45 that smoothes an electric current, and a voltage detector 43*c* that detects a post-stage voltage of the smoothing reactor 45 (=the voltage of the power storage apparatus 60) and outputs the post-stage voltage to the converter control unit 46 as a converter output voltage VB are provided.

The detection signals ESD, EFCD, VB, and IB from the voltage detectors 43*a*, 43*b*, and 43*c* and the current detector 47 are input to the converter control unit 46. The control signal VC from the inverter 50 explained later is input to the converter control unit 46. Details of the control signal VC are explained later. The converter control unit 46 generates the ON/OFF signal DGC to the converter circuit 44 based on these input signals.

Figure 3:
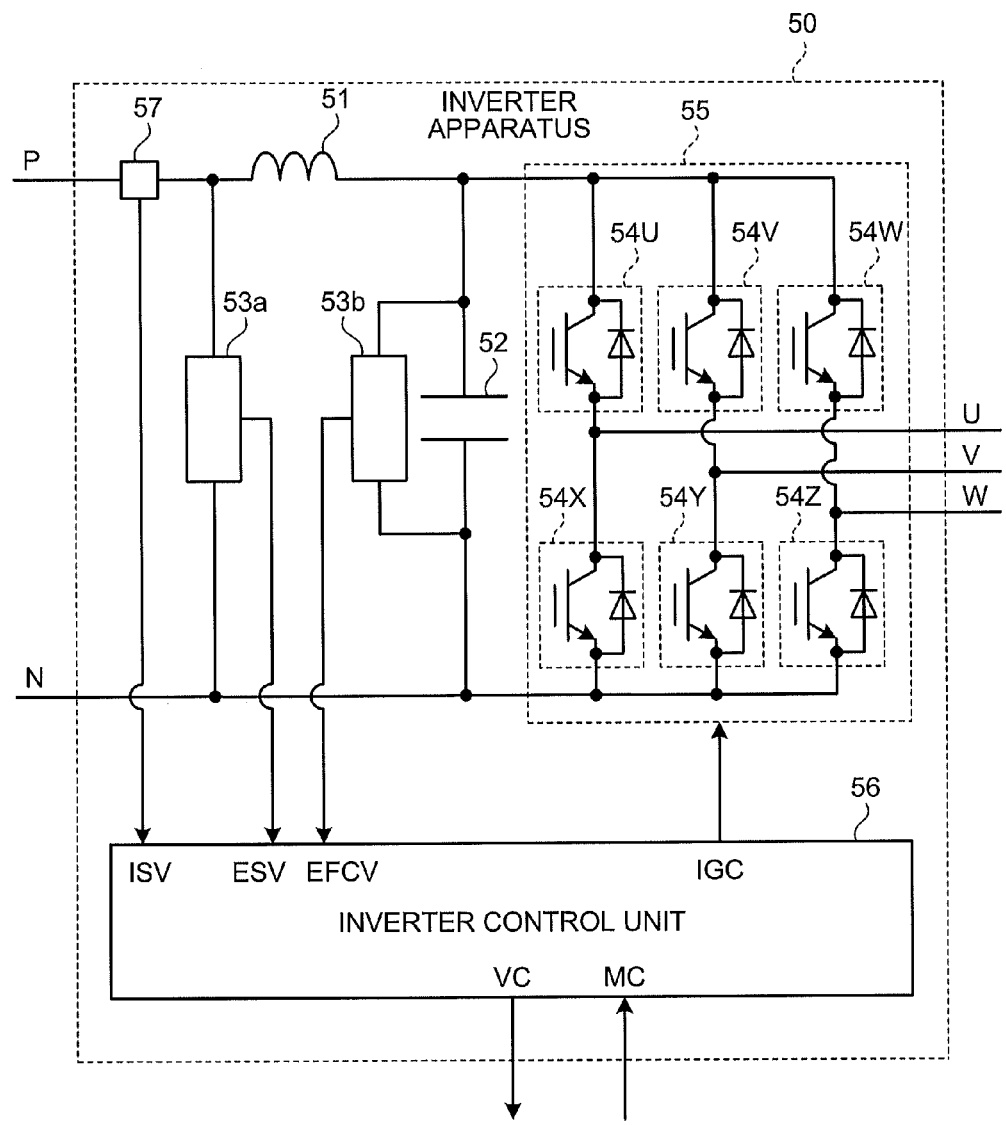
FIG. 3 is a diagram of a configuration example of an inverter apparatus in the first embodiment of the present invention.

The configuration of the inverter 50 is explained. FIG. 3 is a diagram of a configuration example of the inverter 50 in the first embodiment of the present invention. As shown in FIG. 3, electric power from the current collector 2 is input to the input terminals P and N. A current detector 57 that detects an input current and outputs the input current as an inverter input current ISV is arranged at the input terminal P. A reactor 51 is connected to the post stage of the current detector 57. A capacitor 52 is connected to the post stage of the reactor 51.

An LC filter circuit including the reactor 51 and the capacitor 52 suppresses a noise current generated by a switching operation of switching elements explained later from flowing out to the overhead wire 1 and smoothes a ripple component included in the voltage of the overhead wire 1 (an overhead wire voltage) to smooth a both-end voltage of the capacitor 52.

A both-end voltage of the input terminals P and N (=an overhead wire voltage) is detected by a voltage detector 53*a* and input to an inverter control unit 56 as the overhead wire voltage ESV. The both-end voltage of the capacitor 52 is detected by a voltage detector 53*b* and input to the inverter control unit 56 as a voltage detection value EFCV.

The voltage of the capacitor 52 is input to an inverter circuit 55. The inverter circuit 55 includes switching elements 54U, 54V, 54W, 54X, 54Y, and 54Z. The switching elements are subjected to ON/OFF control (switching control) by an ON/OFF signal IGC from an inverter control unit 56. The inverter circuit 55 is a voltage type three-phase two-level inverter circuit and has a function of converting the voltage of the capacitor 52 into an AC voltage having an arbitrary magnitude and an arbitrary frequency according to switching control by the switching elements 54U, 54V, 54W, 54X, 54Y, and 54Z and outputs the AC voltage. Because the configuration and the operation of the inverter circuit 55 are publicly known, explanation of the configuration and the operation is omitted.

Outputs U, V, and W of the inverter circuit 55 are output to the motor 71.

The detection values ESV, EFCV, and ISV from the voltage detector 53*a*, the voltage detector 53*b*, and the current detector 57 explained above are input to the inverter control unit 56. The operation command signal MC from the master controller 10 is input to the inverter control unit 56. The inverter control unit 56 generates, based on these input signals, the ON/OFF signal IGC to the inverter circuit 55 and controls the torque of the motor 71 as desired. The inverter control unit 56 outputs the control signal VC to the converter 40. Details of the control signal VC are explained later.

Figure 4:
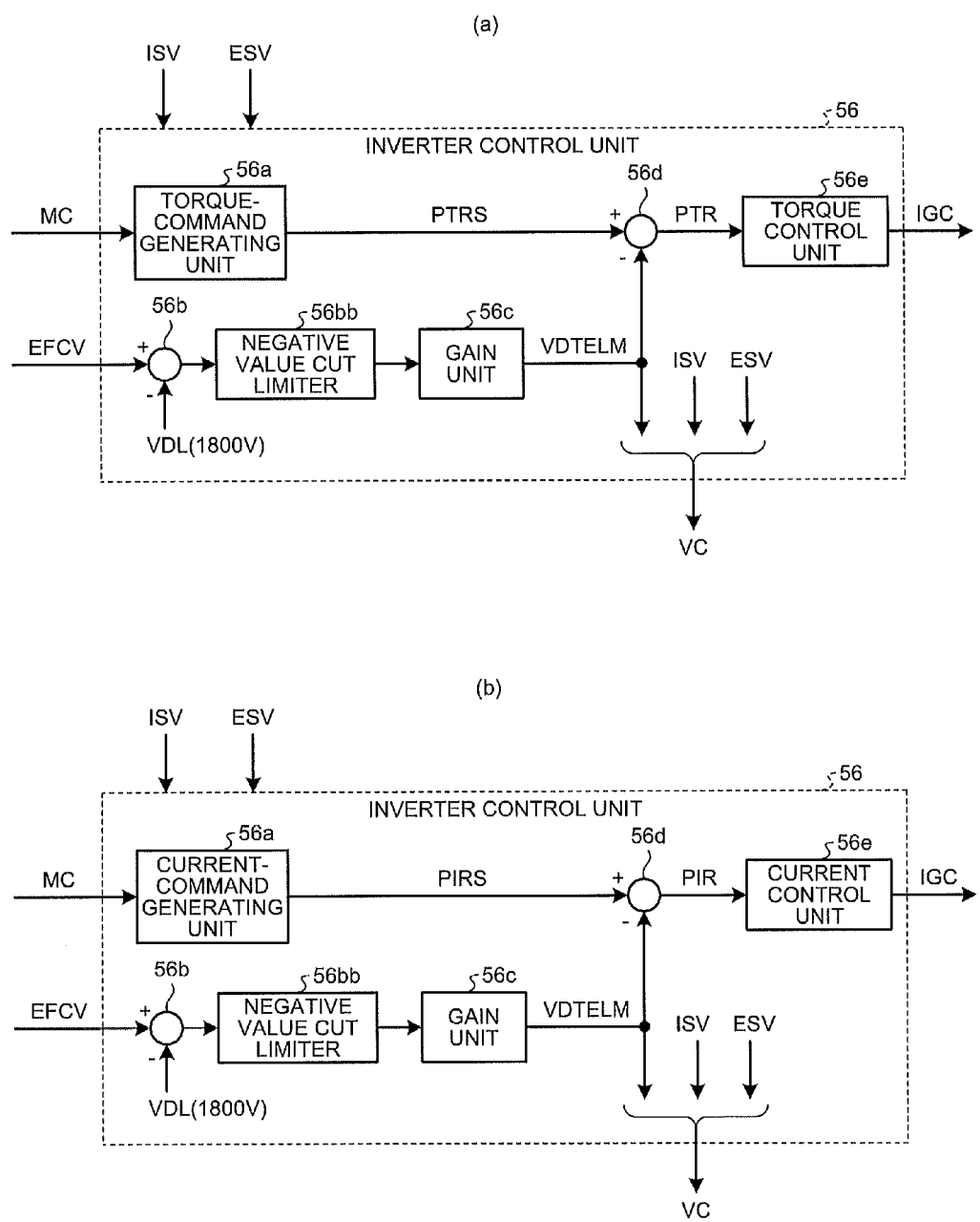
FIG. 4 is a diagram of a configuration example of an inverter control unit in the first embodiment of the present invention.

Control of the torque of the motor 71 in the inverter 50 is explained. FIG. 4 is a diagram of a configuration example of the inverter control unit 56 in the first embodiment of the present invention. As shown in FIG. 4(a), the operation command signal MC is input to a torque-command generating unit 56a. The torque-command generating unit 56a generates, based on a braking force command or the like included in the operation command signal MC, a requested regenerative torque command PTRS, which is a command of regenerative brake torque that the motor 71 should generate.

The voltage detection value EFCV is input to a subtracter 56b. The subtracter 56b outputs a difference between the voltage detection value EFCV and a regeneration suppression start voltage setting value VDL (which is 1800 volts in FIG. 4(a) but can be other value) and inputs the difference to a negative value cut limiter 56bb. The negative value cut limiter 56bb outputs only a positive value to a gain unit (an amplifier circuit) 56c at the post stage.

When the input voltage detection value EFCV exceeds the regeneration suppression start voltage setting value VDL (1800 volts in FIG. 4(a)), the gain unit 56c amplifies an amount of the excess and generates and outputs a suppression amount VDTELM. The gain unit 56c can use a proportional gain, which can further be replaced by an arbitrary function including an integral element or the like.

The requested regenerative torque command PTRS and the suppression amount VDTELM are input to a subtracter 56d. The subtracter 56d calculates a difference between the requested regenerative torque command PTRS and the suppression amount VDTELM and outputs the difference as a regenerative torque command PTR.

The regenerative torque command PTR is input to a torque control unit 56e. The torque control unit 56e generates, based on the regenerative torque command PTR, the ON/OFF signal IGC to the inverter circuit 55 such that regenerative torque generated by the motor 71 coincides with the regenerative torque command PTR.

Because the inverter control unit 56 is configured as explained above, when regenerative loads of other electric motor cars or the like connected to the overhead wire 1 are insufficient and the voltage detection value EFCV increases and exceeds the regeneration suppression start voltage setting value VDL during regenerative braking, it is possible to generate the suppression amount VDTELM according to a degree of the excess, subtract the suppression amount VDTELM from the requested regenerative torque command PTRS, and generate the regenerative torque command PTR, which is a command of regenerative torque of the motor 71.

According to such an operation, the regenerative brake torque of the motor 71 is suppressed to be smaller than a value of the requested regenerative torque command PTRS. Therefore, it is possible to suppress regenerative power from the motor 71. The voltage detection value EFCV is maintained near the regeneration suppression start voltage setting value VDL. It is possible to suppress an excess rise in an overhead wire voltage.

The suppression amount VDTELM is output to the converter 40 as the control signal VC together with other information (in the figure, ISV and ESV). Naturally, the inverter control unit 56 is configured to also perform generation of power running torque. However, the generation of power running torque is not shown in the figure.

Figure 5:
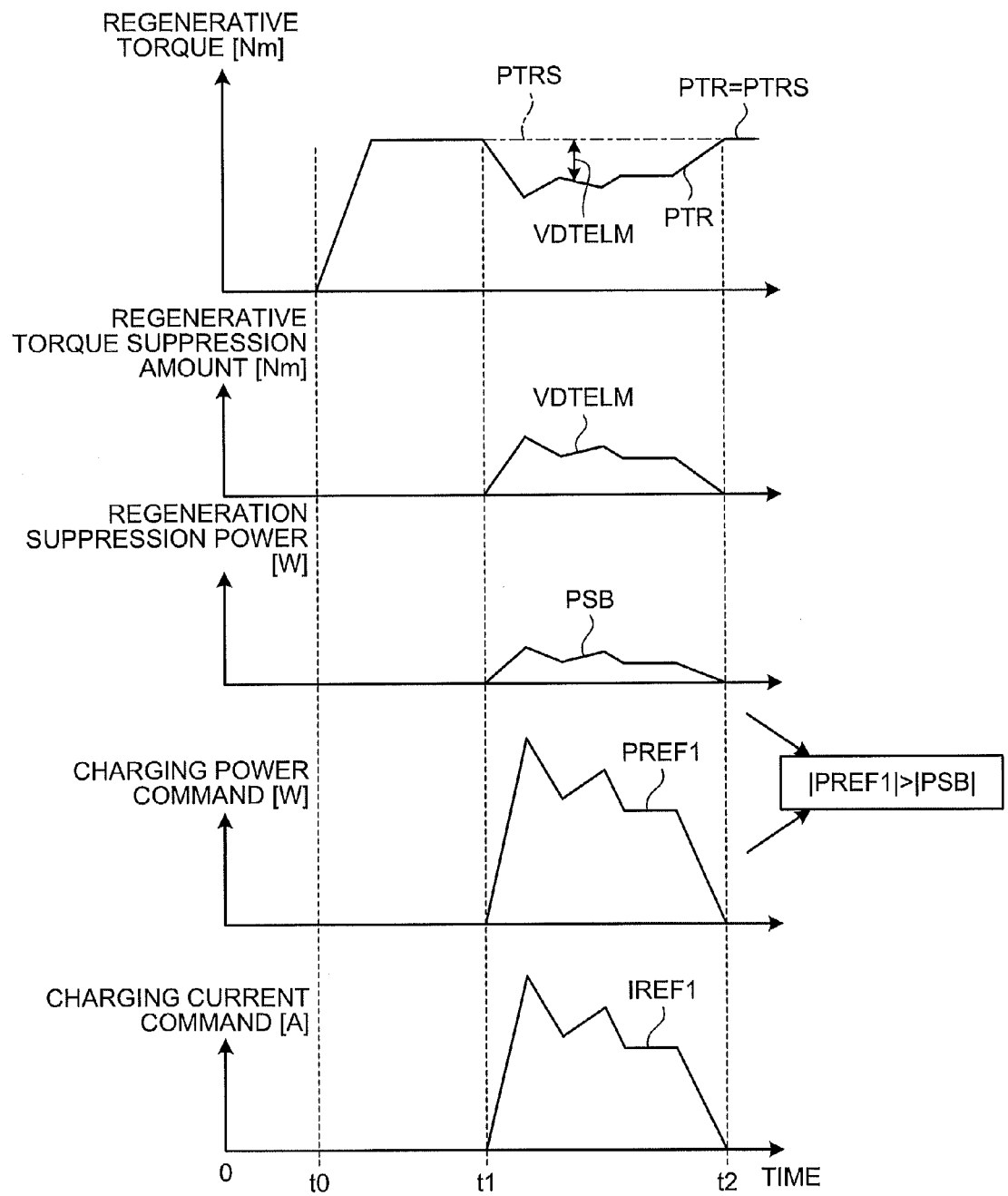
FIG. 5 is a diagram of an example of a relation among signals in the first embodiment of the present invention.

The operation of the inverter control unit 56 is explained on a time axis with reference to FIG. 5. FIG. 5 is a diagram of an example of a relation among signals in the first embodiment of the present invention. Specifically, in FIG. 5, an example of a relation among the requested regenerative torque command PTRS, the suppression amount VDTELM, the regenerative torque command PTR, regeneration suppression power PSB, a charging power command PREF1, and a charging current command (a charging current command value) IREF1 is shown.

In FIG. 5, the regenerative torque command PTR, the suppression amount VDTELM, the regeneration suppression power PSB, the charging power command RPEF1, and the charging current command IREF1 of the motor 71 are shown in order from the top. The regeneration suppression power PSB, the charging power command PREF1, and the charging current command IREF1 are explained later.

At timing of time t0 shown in FIG. 5, the inverter control unit 56 receives the operation command signal MC including a start command for a regenerative brake and generates the regenerative torque command PTR as explained above. The inverter control unit 56 generates the ON/OFF signal IGC and performs control of the motor 71 such that the motor 71 outputs a torque value that coincides with the regenerative torque command PTR.

At time t1, a state in which the regenerative load of the overhead wire 1 is insufficient with respect to the regenerative power of the motor 71 and the voltage detection value EFCV increases and exceeds the regeneration suppression start voltage setting value VDL. At this point, as explained with reference to FIG. 4(a), the suppression amount VDTELM is generated. Therefore, the regenerative torque command PTR is a value obtained by subtracting the suppression amount VDTELM from the requested regenerative torque command PTRS (indicated by an alternate long and short dash line) requested by the operation command signal MC. The torque control unit 56e performs the control of the motor 71 based on the regenerative torque command PTR. Consequently, in the regenerative power from the motor 71, the voltage detection value EFCV is suppressed to near the regeneration suppression start voltage setting value.

At time t2, the state in which the regenerative load of the overhead wire 1 is insufficient with respect to the regenerative power of the motor 71 is eliminated. Therefore, the suppression amount VDTELM decreases to zero and the regenerative torque command PTR becomes equal to the requested regenerative torque command PTRS.

Figure 6:
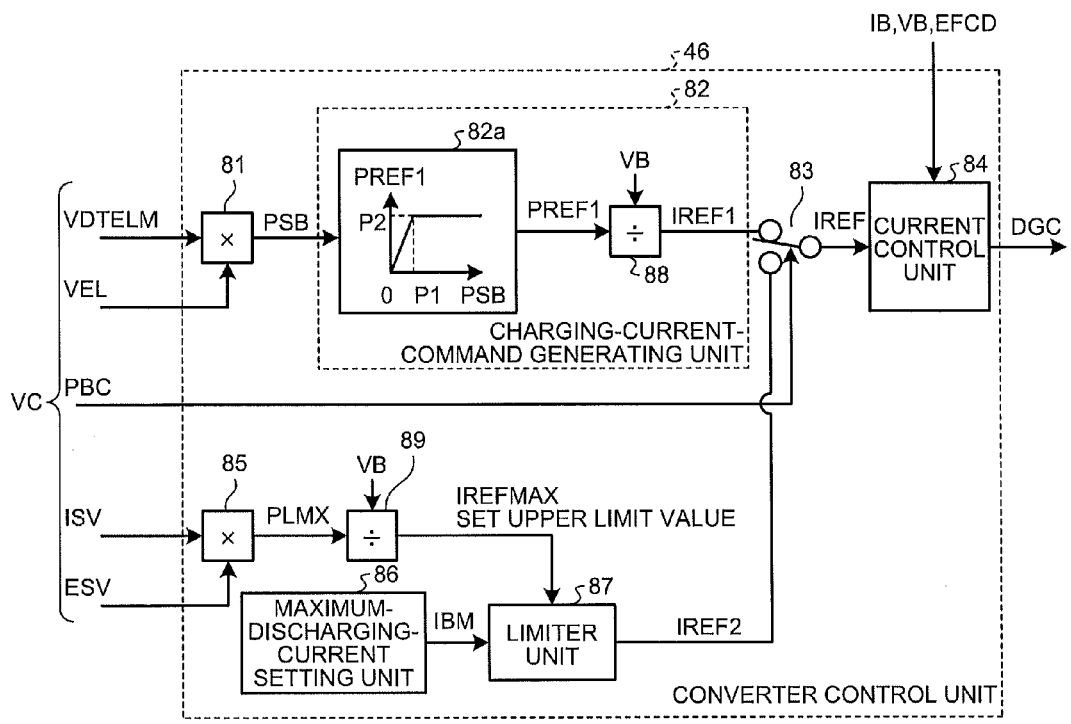
FIG. 6 is a diagram of a configuration example of a converter control unit in the first embodiment of the present invention.

The converter control unit 46, which is the core of the present invention, is explained. FIG. 6 is a diagram of a configuration example of the converter control unit 46 in the first embodiment of the present invention. As shown in FIG. 6, the suppression amount VDTELM and the speed VEL of the electric motor car (which can be the output frequency of the inverter 50, the number of revolutions of the motor 71, etc.) are multiplied together by a multiplier 81 and output to a charging-current-command generating unit 82 (reference; torque [Nm]×speed [rad/s]=power [kW]). A conversion coefficient and the like necessary in calculating electric power are not shown in FIG. 6.

The charging-current-command generating unit 82 generates the charging current command IREF1 based on the regeneration suppression power PSB and outputs the charging current command IREF1 to a selecting unit 83. The charging-current-command generating unit 82 includes a charging-power-command calculating unit 82a and a divider 88. When the regeneration suppression power PSB is zero, the charging-current-command generating unit 82 maintains the charging power command PREF1 at zero. When the regeneration suppression power PSB is generated, the charging-current-command generating unit 82 generates the charging power command PREF1 according to the regeneration suppression power PSB. The charging-current-command generating unit 82 divides, with the divider 88, the charging power command PREF1 by the converter output voltage VB to convert the charging power command PREF1 into the charging current command IREF1. In FIG. 6, the charging power command PREF1 is generated in proportion to the regeneration suppression power PSB. However, the charging power command PREF1 is not limited to this.

The charging power command PREF1 has a characteristic that, when the regeneration suppression power PSB exceeds P1, the upper limit of the charging power command PREF1 is maintained at P2. P2 is a value obtained taking into account a charging receiving power upper limit of a power storage device incorporated in the power storage apparatus 60. By adopting such a characteristic, it is possible to generate the charging power command PREF1 corresponding to the regeneration suppression power PSB within an ability range of the power storage device. P2 can be determined based on a charging receiving current upper limit of the power storage device.

A relation among the requested regenerative torque command PTRS, the suppression amount VDTELM, the torque command PTR, the regeneration suppression power PSB, the charging power command PREF1, and the charging current command IREF1 is shown in FIG. 5. It is desirable to set the charging power command PREF1 to be a value larger than the regeneration suppression power PSB as explained later (i.e., gain>1).

The converter control unit 46 generates power running power PLMX when the input current ISV and the overhead wire voltage ESV of the inverter 50 are input to a multiplier 85 and multiplied together. The converter control unit 46 divides, with a divider 89, the power running power PLMAX by the converter output voltage VB to convert the power running power PLMX into a discharging current upper limit value IREFMAX on the output side (the power storage apparatus 60 side) of the converter 40.

A maximum-discharging-current setting unit 86 provided on the inside of the converter control unit 46 outputs a maximum discharging current setting value (an allowable maximum current value) IBM according to the performance of the power storage device incorporated in the power storage apparatus 60.

A limiter unit 87 limits an upper limit of the maximum discharging current setting value IBM with the charging current upper limit value IREFMAX and outputs a discharging current command (a discharging current command value) IREF2. Specifically, the limiter unit 87 generates smaller one of the maximum discharging current setting value IBM and the discharging current upper limit value IREFMAX as the discharging current command IREF2.

According to the power running regeneration state signal PBC included in the control signal VC, the selecting unit 83 selects IREF2 when the inverter 50 is in the power running control state, selects IREF1 when the inverter 50 is in the regenerative brake state, and outputs IREF2 or IREF1 as a charging and discharging current command (a charging and discharging current command value) IREF.

The charging and discharging current command IREF is input to a current control unit 84. Besides the charging and discharging current command IREF, which is a command of the output current IB of the converter 40, the converter output current IB, the converter output voltage VB, and the voltage detection value EFCD are input to the current control unit 84. The current control unit 84 performs, based on these signals, current control such that the converter output current IB coincides with the charging and discharging current command IREF and outputs the converter output current IB as the ON/OFF signal DGC for the switching elements. By performing the control in this way, the converter 40 can perform charging in and discharging from the power storage apparatus 60 based on the regeneration suppression power PSB or the power running power PLMX.

A configuration can be adopted in which, for example, although not shown in the figure, gain conditions 0 to 1 are provided anew between the divider 89 and the limiter unit 87 and, for example, when the electric motor car is traveling at speed lower than predetermined speed, a gain is set to a small value including zero and, when the electric motor car is traveling at speed equal to or higher than the predetermined speed, the gain is changed (e.g., 1) and the discharging current upper limit value IREFMAX is adjusted and output.

Besides, a configuration can be adopted in which, when the power running power PLMX is smaller than predetermined magnitude, a gain is set to a small value including zero and, when the power running power PLMX is equal to or larger than the predetermined magnitude, the gain is changed (e.g., 1) and the discharging current upper limit value IREFMAX is adjusted and output.

In this way, the discharging current upper limit value IREFMAX can be adjusted according to a control state of the inverter 50 or a traveling state of the electric motor car. Therefore, it is possible to adjust discharging power from the power storage apparatus 60 within a range of the power running power PLMX. For example, it is also possible to perform so-called peak-cut control for, for example, generating larger discharging power in an area where the power running power PLMX is large, supplementing the power consumption of the inverter 50, and suppressing electric power received from the overhead wire 1.

As explained above, the converter apparatus 40 according to this embodiment includes the converter control unit 46 that generates, based on the suppression amount VDTELM indicating a state of regenerative torque or a state of regenerative power of the motor, the charging current command IREF1 with which the converter apparatus 40 charges the power storage apparatus 60, generates the charging and discharging current command IREF of the converter apparatus 40 based on the charging current command IREF1, and performs control. Therefore, when the load of the overhead wire 1 decreases with respect to regenerative power while the inverter 50 is performing a regenerative braking operation, charging (regenerative power absorption) of electric power in the power storage apparatus 60 can be performed in association with the generation of the suppression amount VDTELM involved in the increase in the voltage detection value EFCV. Therefore, because the regenerative power absorption can be performed if the suppression amount VDTELM is generated even a little, it is possible to collect larger braking energy and suppress the suppression amount VDTELM. As a result, because a frequency of suppressing the regenerative brake is reduced, it is possible to suppress wear of a mechanical brake.

In a system for determining a command of a charging current to the power storage apparatus based on a deviation between an overhead wire voltage or a capacitor voltage and a predetermined value, which is a configuration in the past, there is a problem in that, because of the influence of a detection error of the overheard wire voltage detectors 43a and 53a or the capacitor voltage detectors 43b and 53b respectively incorporated in the inverter 50 and the converter 40, in some case, regardless of the fact that regenerative torque is suppressed in the inverter 50, charging (regenerative power absorption) in the power storage apparatus 60 is not performed.

As a specific example, it is assumed that, at the same overhead wire voltage, the voltage detection value EFCD of the capacitor voltage detector 43b of the converter 40 is smaller than a detection value of the voltage detection value EFCV of the capacitor voltage detector 53*b* of the inverter 50. Even in a state in which, while the inverter 50 is performing the regenerative braking operation, the load of the overhead wire 1 decreases with respect to regenerative power, the voltage detection value EFCV increases and exceeds the regeneration suppression start voltage setting value VDL, and the suppression amount VDTELM is generated and regenerative torque is suppressed according to the increase in the voltage detection value EFCV, because a detection value of the voltage detector 43*b* of the converter 40 does not exceed a predetermined setting value (e.g., a value equal to the regeneration suppression start voltage setting value VDL), in some case, the regenerative power absorption in the power storage apparatus 60 cannot be performed.

In the configuration of the present invention, because the charging (the regenerative power absorption) in the power storage apparatus 60 is performed based on the suppression amount VDTELM from the inverter 50, the inconvenience explained above does not occur. Therefore, when the suppression amount VDTELM is generated even a little, it is possible to collect larger braking energy and suppress the suppression amount VDTELM. Consequently, a frequency of suppressing the regenerative brake is reduced and it is possible to reduce an operation frequency of the mechanical brake. As a result, it is possible to reduce wear of a brake shoe.

In the system for determining a charging current command based on an overhead wire voltage or a capacitor voltage, which is the configuration in the past, there is another problem explained below.

The voltage detection value EFCV of the inverter 50 and the voltage detection value EFCD of the converter 40 are respectively values obtained taking into account voltage drops in the reactors 51 and 41 with reference to the overhead wire voltage ESV (=ESD) of the overhead wire 1. Therefore, when both of the input current ISV of the inverter 50 and an input current ISD of the converter 40 are zero, the voltage detection value EFCV and the voltage detection value EFCD are equal. However, when the input current ISV of the inverter 50 and the input current ISD of the converter 40 are not zero in operation, voltage drops in the reactors 51 and 41 occur. Therefore, even under the same overhead wire voltage, a voltage difference occurs between the voltage detection value EFCV and the voltage detection value EFCD by the voltage drops.

There is a problem in that, because of the influence of the voltage difference, in some case, regardless of the fact that regenerative torque is suppressed in the inverter 50, the charging (the regenerative power absorption) in the power storage apparatus 60 is not performed.

It is assumed that the voltage detection value EFCD of the capacitor voltage detector 43*b* of the converter 40 is smaller than the voltage detection value EFCV of the capacitor voltage detector 53*b* of the inverter 50. Even in a state in which, while the inverter 50 is performing the regenerative braking operation, the load of the overhead wire 1 decreases with respect to regenerative power, the voltage detection value EFCV increases and exceeds the regeneration suppression start voltage setting value VDL, and the suppression amount VDTELM is generated and regenerative torque is suppressed according to the increase in the voltage detection value EFCV, because the voltage detection value EFCD of the voltage detector 43*b* of the converter 40 does not exceed a predetermined setting value (e.g., a value equal to the regeneration suppression start voltage setting value VDL), in some case, the regenerative power absorption in the power storage apparatus 60 cannot be performed.

In the configuration of the present invention, because the charging (the regenerative power absorption) in the power storage apparatus 60 is performed based on the suppression amount VDTELM from the inverter 50, the inconvenience explained above does not occur. Therefore, when the suppression amount VDTELM is generated even a little, it is possible to collect larger braking energy and suppress the suppression amount VDTELM. Consequently, a frequency of suppressing the regenerative brake is reduced. Therefore, because it is possible to reduce an operation frequency of the mechanical brake, it is possible to reduce wear of the brake shoe.

In the configuration of the present invention, the charging current command IREF1 and the discharging current command IREF2 are switched by the power running regeneration state signal PBC in the selecting unit 83 to generate the charging and discharging current command IREF. Therefore, it is possible to optimally generate and select a charging current command or a discharging current command according to a control state (a power running state/a regeneration state) of the inverter 50 and control the converter 40.

A point that should be kept in mind concerning the generation of the charging power command PREF1 is explained below. In FIG. 6, it is suitable to configure the charging-current-command generating unit 82 such that the charging power command PREF1, which is the charging power command to the power storage apparatus 60, is larger than the regeneration suppression power PSB.

Figure 7:
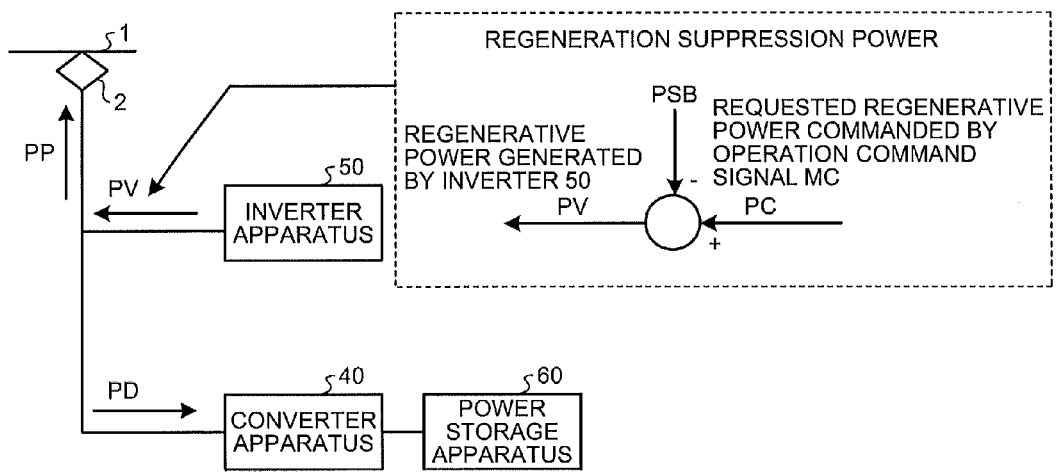
FIG. 7 is a diagram for explaining a power flow during regenerative braking in the first embodiment of the present invention.

The reason for this is as explained below. FIG. 7 is a diagram for explaining a power flow during regenerative braking in the first embodiment of the present invention. As shown in FIG. 7, electric power (regenerative power) output from the inverter 50 is defined as PV, electric power (regeneration absorption power) charged in the power storage apparatus 60 via the converter 40 is defined as PD, and electric power (overhead wire regenerative power) flowing out to the overhead wire 1 via the current collector 2 is defined as PP.

The regenerative power PV is a value generated based on the regenerative torque command PTR and the speed VEL of the electric motor car (synonymous with the rotating speed of the motor 71). The regenerative power PV is a value obtained by subtracting the regeneration suppression power PSB based on the suppression amount VDTELM and the speed VEL of the electric motor car (synonymous with the rotating speed of the motor 71) from the requested regenerative power PC based on the requested regenerative torque command PTRS generated based on the operation command signal MC or the like from the master controller 10 and the speed VEL of the electric motor car (synonymous with the rotating speed of the motor 71).

In FIG. 7, when the suppression amount VDTELM of the inverter 50 is generated during the regenerative braking, to reduce the suppression amount VDTELM to zero and eliminate a suppression state of regenerative torque, the power storage apparatus 60 only has to absorb electric power equal to the regeneration suppression power PSB, which is electric power that cannot be regenerated in the overhead wire 1, as the regeneration absorption power PD.

When it is assumed that the charging power command PREF1 is set to a value equal to the regeneration suppression power PSB, behavior is as explained below and the apparatuses do not operate as intended above.

As an operation state example, it is assumed that the inverter 50 is performing the regenerative braking operation at the requested regenerative power PC=1000 kW in a state in which the converter 40 is stopped and a state in which a regenerative load is present in the overhead wire 1 by about 500 kilowatts. An operation state at this point is as explained below.

The requested regenerative power PC=1000 kW, the overhead wire regenerative power PP=500 kW, the regenerative power PV (=PC−PSB)=500 kW, the regeneration suppression power PSB=500 kW, and the regeneration absorption power PD=0 kW.

At this point, when the operation of the converter 40 is started and the converter 40 is actuated with the charging power command PREF1 set to 500 kilowatts equal to the regeneration suppression power PSB, the converter 40 operates to charge 500 kilowatts in the power storage apparatus 60 as the regeneration absorption power PD.

Immediately after this, when the regeneration absorption power PD reaches 500 kilowatts, a regenerative load from the viewpoint of the inverter 50 increases, regenerable power increases, and the regeneration suppression power PSB decreases from 500 kilowatts. However, because the charging power command PREF1 is also set to be equal to the regeneration suppression power PSB, the charging power command PREF1 decreases from initial 500 kilowatts. Therefore, the regeneration absorption power PD also decreases from 500 kilowatts.

After all, the regeneration suppression power PSB and the regeneration absorption power PD are in equilibrium at an operation point of the regeneration suppression power PSB=250 kW and the regeneration absorption power PD=250 kW, which is a point where the regeneration suppression power PSB and the regeneration absorption power PD are balanced. In other words, as an operation state after the equilibrium, the requested regenerative power PC=1000 kW, the overhead wire regenerative power PP=500 kW, the regenerative power PV (=PC−PSB)=750 kW, the regeneration suppression power PSB=250 kW, and the regeneration absorption power PD=250 kW. A motion from the initial state to the equilibrium state is a transitional phenomenon that occurs in an extremely short time (several tens milliseconds).

As explained above, when the charging power command PREF1 is set to a value equal to the regeneration suppression power PSB, the regeneration absorption power PD is insufficient and the regeneration suppression power PSB (the suppression amount VDTELM) cannot be reduced to zero.

To avoid the deficiency, it is desirable to set the charging power command PREF1 larger than the regeneration suppression power PSB. As an example, in the following explanation, the charging power command PREF1 is set to nine times as large as the regeneration suppression power PSB.

As an operation state example, as in the case explained above, it is assumed that the inverter 50 is performing the regenerative braking operation in a state of the requested regenerative power PC=1000 kW in a state in which the converter 40 is stopped and a state in which the regenerative load of the overhead wire 1 is 500 kilowatts. An operation state at this point is the same as that in the above explanation and is as explained below.

The requested regenerative power PC=1000 kW, the overhead wire regenerative power PP=500 kW, the regenerative power PV (=PC−PSB)=500 kW, the regeneration suppression power PSB=500 kW, and the regeneration absorption power PD=0 kW.

At this point, when the operation of the converter 40 is started and the charging power command PREF1 is set to 4500 kilowatts, which is nine times as large as PSB, the converter 40 operates to charge 4500 kilowatts in the power storage apparatus 60 as the regeneration absorption power PD.

Immediately after this, when the regeneration absorption power PD reaches 4500 kilowatts, a regenerative load from the viewpoint of the inverter 50 increases, regenerable power increases, and the regeneration suppression power PSB decreases from 500 kilowatts. According to the decrease in the regeneration suppression power PSB, the charging power command PREF1 set to nine times as large as the regeneration suppression power PSB also decreases from 4500 kilowatts. Therefore, the regeneration absorption power PD also decreases from 4500 kilowatts.

After all, the regeneration suppression power PSB and the regeneration absorption power PD are in equilibrium at an operation point of the regeneration suppression power PSB=50 kW and the regeneration absorption power PD=450 kW, which is a point where the regeneration suppression power PSB and the regeneration absorption power PD are balanced. In other words, as an operation state after the equilibrium, the requested regenerative power PC=1000 kW, the overhead wire regenerative power PP=500 kW, the regenerative power PV (=PC−PSB)=950 kW, the regeneration suppression power PSB=50 kW, and the regeneration absorption power PD=450 kW.

A motion from the initial state to the equilibrium state is a transitional phenomenon that occurs in an extremely short time (several tens milliseconds). Actually, the regeneration absorption power PD and the like do not reach 4500 kilowatts and quickly shift to the equilibrium state.

As explained above, it is seen that, when the charging power command PREF1 is set larger than the regeneration suppression power PSB, compared with the time when the charging power command PREF1 is set to a value equal to the regeneration suppression power PSB, the regeneration absorption power PD is large and the regenerative power PV is also large. In other words, when the charging power command PREF1 is set larger than the regeneration suppression power PSB, it is possible to reduce the suppression amount VDTELM of the inverter 50 and regenerate larger power with respect to the requested regenerative power PC. It is possible to collect larger regenerative power in the power storage apparatus 60. Consequently, it is possible to reuse, during power running or the like, power collected in the power storage apparatus 60 to improve power saving properties of the propulsion control apparatus for an electric motor car. Because an operation frequency of the mechanical brake can be reduced, it is possible to reduce wear of the brake shoe.

In the above explanation, for ease of the explanation, the charging power command PREF1 is set to nine times as large as the regeneration suppression power PSB. However, the charging power command PREF1 is not limited to this. It is desirable to set the charging power command PREF1 larger than the regeneration suppression power PSB as long as safety of a control system is secured.

In the above explanation, the configuration for calculating a product of the suppression amount VDTELM, which is a regeneration state signal indicating a state of regenerative torque on the inside of the converter control unit 46, and the speed VEL to generate the regeneration suppression power PSB is explained. However, a configuration other than this can be adopted. For example, a configuration for generating the regeneration suppression power PSB, which is a regeneration state signal, in the inverter 50 and outputting the regeneration suppression power PSB to the converter control unit 46 can be adopted.

In the explanation, when the suppression amount VDTELM indicating a suppression state of regenerative torque and the regeneration suppression power PSB indicating a suppression state of regenerative power are collectively referred to, the suppression amount VDTELM and the regeneration suppression power PSB are described as regeneration state signal.

Besides the method of directly inputting a regeneration suppression signal from the inverter 50 to the converter 40 explained above, a configuration can be adopted in which the inverter 50 transmits a regeneration state signal to a not-shown external overall control apparatus and the overall control apparatus transmits the regeneration state signal of the inverter 50 to the converter 40.

Second Embodiment

Figure 8:
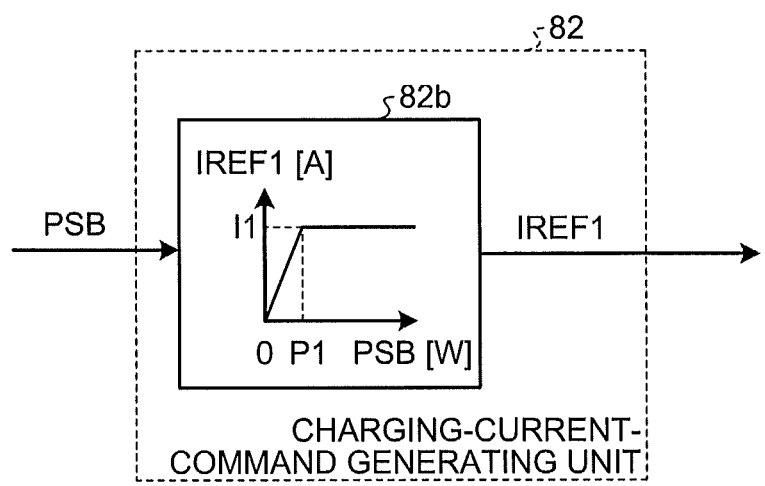
FIG. 8 is a diagram of a configuration example of a charging-current-command generating unit in a second embodiment of the present invention.

FIG. 8 is a diagram of a configuration example of the charging-current-command generating unit 82 in a second embodiment of the present invention. As shown in FIG. 8, the charging-current-command generating unit 82 includes a charging-current-command calculating unit 82b. In this way, a configuration for generating the charging current command IREF1 directly from the regeneration suppression power PSB via a gain table can be adopted.

As explained above, the charging-current-command generating unit 82 according to this embodiment generates, with the charging-current-command calculating unit 82b, the charging current command IREF1 from the regeneration suppression command PSB. Therefore, it is possible to delete the divider 88 present in the first embodiment and realize simplification of a calculating unit.

Third Embodiment

Figure 9:
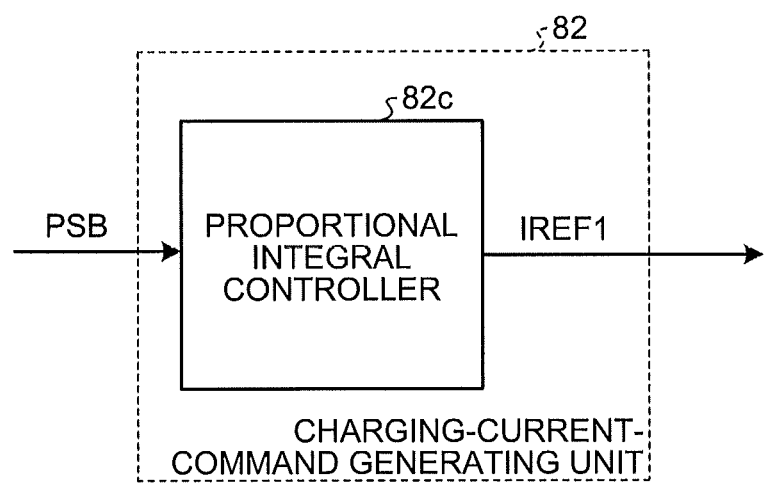
FIG. 9 is a diagram of a configuration example of a charging-current-command generating unit in a third embodiment of the present invention.

FIG. 9 is a diagram of a configuration example of the charging-current-command generating unit 82 in a third embodiment of the present invention. As shown in FIG. 9, a configuration for configuring the charging-current-command generating unit 82 from a proportional integral controller 82c, inputting the regeneration suppression power PSB, and generating the charging current command IREF1 via a proportional integral element can be adopted.

As explained above, the charging-current-command generating unit 82 according to this embodiment generates, with the proportional integral controller 82c, the charging current command IREF1 from the regeneration suppression power PSB. Therefore, compared with the configuration example of the first embodiment, it is possible to generate the charging current command IREF1 that makes the regeneration suppression power PSB completely zero. Therefore, it is possible to collect larger regenerative power in the power storage apparatus 60.

Fourth Embodiment

Figure 10:
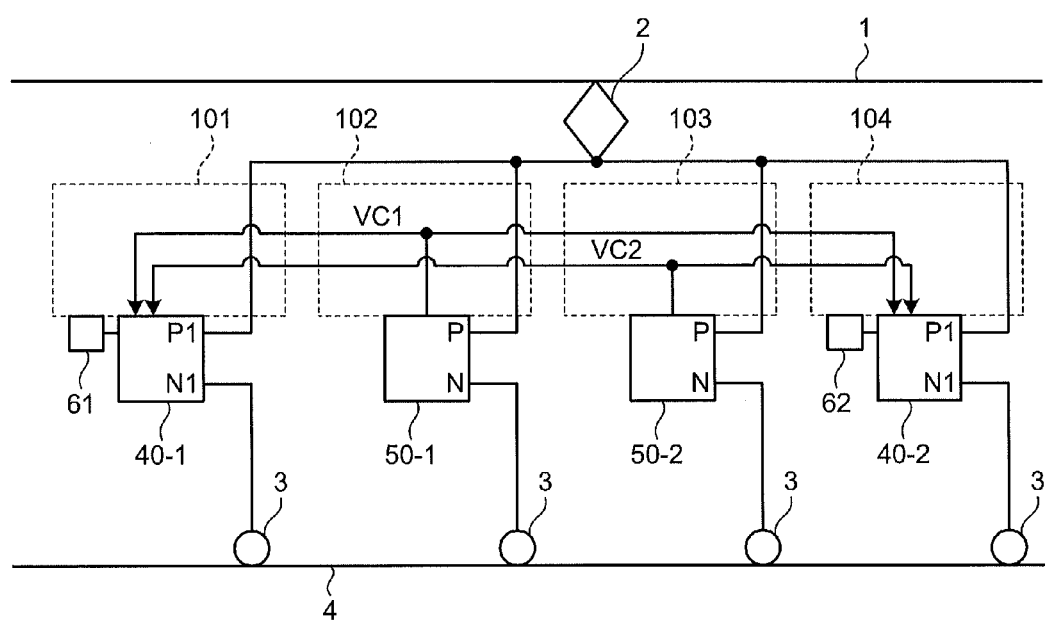
FIG. 10 is a diagram of a configuration example in an electric motor car including a plurality of inverter apparatuses and converter apparatuses in a fourth embodiment of the present invention.

FIG. 10 is a diagram of a configuration example in an electric motor car including a plurality of inverter apparatuses and converter apparatuses in a fourth embodiment of the present invention. In FIG. 10, an example in which a train formation includes four electric motor cars is shown. A train includes a first car 101, a second car 102, a third car 103, and a fourth car 104.

A first converter apparatus 40-1 and a first power storage apparatus 61 are mounted on the first car 101. A first inverter apparatus 50-1 is mounted on the second car 102. A second inverter apparatus 50-2 is mounted on the third car 103. A second converter apparatus 40-2 and a second power storage apparatus 62 are mounted on the fourth car.

The configurations of the first converter apparatus 40-1, the first power storage apparatus 61, the first inverter apparatus 50-1, the second inverter apparatus 50-2, the second converter apparatus 40-2, and the second power storage apparatus 62 are the same as the configurations of the converter apparatus 40, the inverter apparatus 50, and the power storage apparatus 60 explained in the first embodiment except sections explained below.

In this embodiment, a configuration example in which two inverter apparatuses, two converter apparatuses, and two power storage apparatuses are mounted in four electric motor cars is explained. However, the number and the configurations of the apparatuses are not limited to this. The same idea can be applied as long as the electric motor cars include a plurality of converter apparatuses, a plurality of inverter apparatuses, and a plurality of power storage apparatuses.

The converter apparatuses 40-1 and 40-2 and the power storage apparatuses 61 and 62 are connected as explained in the first embodiment. Positive side terminals P1 of the converter apparatuses 40-1 and 40-2 and positive side terminals P of the inverter apparatuses 50-1 and 50-2 are connected to the overhead wire 1 in common via the current collector 2. Negative side terminals N1 of the converter apparatuses 40-1 and 40-2 and negative side terminals N of the inverter apparatuses 50-1 and 50-2 are connected to the rail 4 in common via the wheels 3.

Control signals VC1 and VC2 are respectively output from the inverter apparatuses 50-1 and 50-2 and respectively input to the converter apparatuses 40-1 and the converter apparatus 40-2. Contents of the control signals VC1 and VC2 are the same as the contents of the control signal VC explained in the first embodiment.

Figure 11:
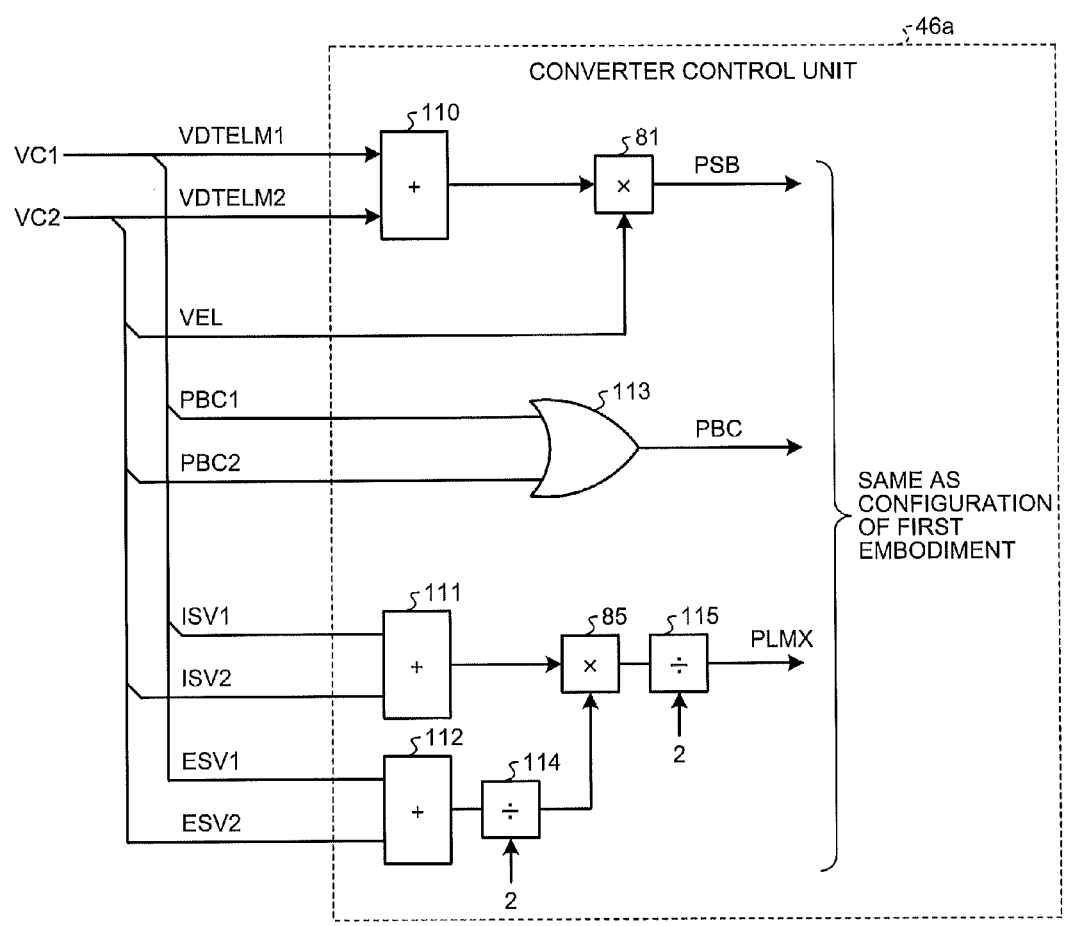
FIG. 11 is a diagram of a configuration example of a converter control unit in the fourth embodiment of the present invention.

FIG. 11 is a diagram of a configuration example of a converter control unit 46a in the fourth embodiment. The converter control unit 46a shown in FIG. 11 is mounted on each of the converters 40-1 and 40-2. As shown in FIG. 11, a suppression amount VDTELM1 included in the control command VC1 and a suppression amount VDTELM2 included in the control command VC2 are input to the converter control unit 46a. An adder 110 calculates a sum of the suppression amounts VDTELM1 and VDTELM2 and generates the suppression amount VDTELM. The multiplier 81 multiplies the suppression amount VDTELM and the speed VEL together and generates and outputs the regeneration suppression power PSB. Operations after this are omitted because the operations are explained in the first embodiment.

A power running regeneration state signal PBC1 included in the control command VC1 and a power running regeneration state signal PBC2 included in the control command VC2 are input to the converter control unit 46a. An OR circuit 113 calculates an OR of the power running regeneration state signals PBC1 and PBC2 and generates the power running regeneration state signal PBC. Operations after this are omitted because the operations are explained in the first embodiment.

Further, an input current ISV1 and an overhead wire voltage ESV1 of the inverters 50-1 and 50-2 included in the control command VC1 and an input current ISV2 and an overhead wire voltage ESV2 of the inverters 50-1 and 50-2 included in the control command VC2 are input to the converter control unit 46a. An adder 111 calculates a sum of the input current ISV1 and the input current ISV2 and outputs a result of the calculation as the input current ISV. An adder 112 calculates a sum of the overhead wire voltage ESV1 and the overhead wire voltage ESV2. A divider 114 divides a result of the calculation by two (the number of the converters 40 in the train) to average the result and outputs the averaged result as the overhead wire voltage ESV. The multiplier 85 multiplies the input current ISV and the overhead wire voltage ESV together. A divider 115 divides a result of the multiplication by two (the number of the converters 40 in the train) to average the result and generates the power running power PLMX.

The charging and discharging current command IREF is generated as in the first embodiment using the regeneration suppression power PSB, the power running regeneration state signal PBC, and the power running power PLMX generated as explained above to control the converter 40.

By configuring the propulsion control apparatus for an electric motor car as explained above, there are effects explained below compared with the example in the past. In the system for determining a command of a charging current to the power storage apparatus based on a deviation between an overhead wire voltage or a capacitor voltage and a predetermined value, which is a configuration in the past, when a plurality of inverter apparatuses, converter apparatuses, power storage apparatuses are present in a train formation, a regenerative torque suppression amount of the inverter apparatuses and regeneration absorption power of the converter apparatuses are controlled with reference to an overhead wire voltage, which the respective apparatuses individually have, or detection voltages of the capacitor voltage detectors. However, as explained above, there is an error in detection values of the voltage detectors. Therefore, when an overhead wire voltage or a capacitor voltage rises during regenerative braking, a relation between the overhead wire voltage or the capacitor voltage and the predetermined setting value (whether the overhead wire voltage or the capacitor voltage exceeds the predetermined setting value or a degree of the excess) is different for each of the apparatuses. Therefore, regeneration absorption current values of the converter apparatuses fluctuate and imbalance occurs in operation states of the converter apparatuses and the power storage apparatuses. In other words, even in a system connected to the same overhead wire 1, a converter apparatus including a voltage detector that detects an overhead wire voltage or a capacitor voltage lower than a true value has small regeneration absorption power and a converter apparatus including a voltage detector that detects an overhead wire voltage or a capacitor voltage higher than the true value has large regeneration absorption power.

When an overhead wire voltage or a capacitor voltage is present near the predetermined setting value, there are the converter apparatus, a detection value of which exceeds the predetermined setting value, and the converter apparatus, a detection value of which is lower than the predetermined setting value. In some case, only a part of the converter apparatuses perform a regenerative power absorbing operation and change to an operation state. When fluctuation occurs in operation states of the converter apparatuses and the power storage apparatuses in this way, there is a problem in that, for example, the life of the apparatuses that are often in the operation state is shortened.

In some case, regardless of the fact that a capacitor voltage exceeds the predetermined setting value while an inverter is performing regenerative braking and a regenerative torque suppression amount is generated, a capacitor voltage of the converter apparatus is lower than the predetermined setting value and the converter apparatus does not perform the regenerative power absorbing operation. In such a case, because regenerative torque is kept unnecessarily suppressed, wear of a mechanical brake shoe and a waste of regenerative power occur.

In the configuration explained in the fourth embodiment, when the inverters 50-1 and 50-2 respectively generate different suppression amounts VDTELM because of, for example, fluctuation in detection characteristics of the respective voltage detectors 53b of the inverters 50-1 and 50-2, the converters 40-1 and 40-2 can respectively generate the charging current commands IREF1 equivalent to a sum of the suppression amounts VDTELM of the inverters 50-1 and 50-2. Therefore, the respective converters 40-1 and 40-2 can equally share electric power of regeneration absorption. At this point, because the regeneration absorption powers PD of the converters 40-1 and 40-2 are equal, it is possible to make operation states of the converters 40-1 and 40-2 and the power storage apparatus 60 uniform. It is possible to prevent loads from being concentrated on a part of the converters 40-1 and 40-2 and the power storage apparatus 60.

At a point when the suppression amount VDTELM is generated in any one of the inverters 50-1 and 50-2, the converters 40 can respectively generate the charging current commands IREF1 and perform absorption of regenerative power in the converters 40-1 and 40-2 and the power storage apparatus 60. Therefore, it is possible to prevent only a part of the converter apparatuses from changing to the operation state.

As explained above, in the propulsion control apparatus for an electric motor car according to this embodiment, the converters 40-1 and 40-2 generate the charging current commands IREF1 using the suppression amounts VDTELM of the inverters 50-1 and 50-2 as an input. Therefore, even when the inverters 50-1 and 50-2, the converters 40-1 and 40-2, and the power storage apparatus 60 are mounted in a train formation including a plurality of cars, it is possible to collect larger regenerative power in the power storage apparatus 60. Consequently, when electric power collected in the power storage apparatus 60 is reused during power running or the like, it is possible to improve energy saving of the propulsion control apparatus for an electric motor car and reduce an operation frequency of the mechanical brake. Therefore, it is possible to reduce wear of the brake shoe. Further, it is possible to prevent only a part of the converter apparatuses from changing to the operation state and prevent loads from being concentrated on a part of the converters 40 and the power storage apparatus 60. Therefore, it is possible to solve a problem such as shortened life of the apparatuses due to fluctuation in operation states.

In the above explanation, the configuration for generating the regeneration suppression power PSB in the converter control unit 46a based on a product of the suppression amount VDTELM and the speed VEL is explained. However, a configuration other than this can be adopted. For example, a configuration for generating the regeneration suppression power PSB on the inside of the inverter 50 and outputting the regeneration suppression power PSB to the converter control unit 46a can be adopted.

In FIG. 11, the converter control unit 46a calculates a sum of the suppression amount VDTELM1, which is a regeneration state signal included in the control command VC1, and the suppression amount VDTELM2, which is a regeneration state signal included in the control command VC2 and generates the suppression amount VDTELM. However, the converter control unit 46a can extract larger one of the regeneration state signal included in the control command VC1 and the regeneration state signal included in the control command VC2 and adopt the regeneration state signal as a regeneration state signal used for control.

Even if the propulsion control apparatus for an electric motor car is configured in this way, at a point when the suppression amount VDTELM is generated in any one of the inverters 50, the converters 40 can respectively generate the charging current commands IREF1 and perform absorption of regenerative power in the converters 40 and the power storage apparatus 60. Therefore, it is possible to prevent only a part of the converter apparatuses from changing to the operation state.

Further, in FIG. 11, the converter control unit 46a calculates a sum of the suppression amount VDTELM1, which is a regeneration state signal included in the control command VC1, and the suppression amount VDTELM2, which is a regeneration state signal included in the control command VC2, and generates the suppression amount VDTELM. However, the converter control unit 46a can calculate an average of the regeneration state signal included in the control command VC1 and the regeneration state signal included in the control command VC2 and adopt the average as a regeneration state signal used for control.

Even if the propulsion control apparatus for an electric motor car is configured in this way, at a point when the suppression amount VDTELM is generated in any one of the inverters 50, the converters 40 can respectively generate the charging current commands IREF1 and perform absorption of regenerative power in the converters 40 and the power storage apparatus 60. Therefore, it is possible to prevent only a part of the converter apparatuses from changing to the operation state.

Besides, other than the method explained above for directly inputting regeneration state signals of the inverters 50 from the inverters 50 to the converters 40, a configuration can be adopted in which the inverters 50 transmit regeneration state signals to a not-shown external overall control apparatus and the overall control apparatus transmits the regeneration state signals of the inverters 50 to the converters 40. In this way, compared with connection of the respective inverters 50 and the respective converters 40 by wires, it is possible to reduce the number of wires that connect the inverters 50 and the converters 40.

A configuration can be adopted in which the overall control apparatus carries out the addition of the regeneration state signals of the inverters 50, the extraction of a maximum, the calculation of an average, and the like and transmits results of the calculations to the converter control units 46a. In this way, the converter control unit 46a does not need to perform an addition, an extraction of a maximum, and a calculation of an average corresponding to the number of inverters. Therefore, it is possible to reduce computational complexity. Further, because a difference in a calculation configuration (a difference in a denominator in calculating an average, etc.) due to fluctuation in the number of the inverters 50 in a train can be absorbed on the overall control apparatus side. Therefore, it is possible to make the configuration of the converter control units 46a the same.

The embodiments of the present invention are not limited to the configurations explained above. The embodiments only have to be a configuration in which the converter control units 46a can recognize regeneration state signals themselves, which are amounts indicating suppression states of regenerative torque or suppression states of regenerative power of the inverters 50, or an added-up value, a maximum, an average, and the like obtained based on the regeneration state signals.

In the configuration explained above, the input current ISV1 of the inverter 50 included in the control command VC1 and the input current ISV2 of the inverter 50 included in the control command VC2 are input to the converter control unit 46a. The converter control unit 46a calculates the power running power PLMX based on an average of the input current ISV1 and the input current ISV2. However, a configuration can be adopted in which input currents are transmitted from the inverters 50 to the external overall control apparatus and the overall control apparatus calculates an average of the input current, calculates the power running power PLMX based on the calculated average, and outputs the power running power PLMX to the converter control units 46a.

In this way, the converter control unit 46a does not need to calculate an average corresponding to the number of the converters 40. Therefore, it is possible to reduce computational complexity. Further, because a difference in a calculation configuration (a difference in a denominator in calculating an average, etc.) due to fluctuation in the number of the converters 40 in a train can be absorbed on the overall control apparatus side. Therefore, it is possible to make the configuration of the converter control units 46a the same.

When a plurality of sets of the inverter 50 and the motor 71 are present, the converter control unit 46a is desirably configured to generate the discharging current command IREF2 based on a sum of input powers of the inverters 50.

When a plurality of sets of the converter 40 and the power storage apparatus 60 are present, the respective converter control units 46a desirably generate the discharging current commands IREF2 based on a value obtained by averaging input powers of the inverter 50 with the number of the converters 40.

When a plurality of sets of the converter 40 and the power storage apparatus 60 are present and a plurality of sets of the inverter 50 and the motor 71 are present, the respective converter control units 46a desirably generate the discharging current commands IREF2 based on a sum of input powers of the inverters 50 input to the converter control units 46a.

When a plurality of sets of the converter 40 and the power storage apparatus 60 are present and a plurality of sets of the inverter 50 and the motor 71 are present, the respective converter control units 46a desirably generate the discharging current commands IREF2 based on a value obtained by averaging, with the number of the converters 40, a sum of input powers of the inverters 50 input to the converter control units 46a.

The inverter 50, the converter 40, and the power storage apparatus 60 are illustrated and explained as separate apparatuses. However, when these apparatuses are housed in the same housing box, the apparatuses can be configured as an integrated apparatus.

In the configurations explained in the embodiments, for example, as shown in FIG. 4(a), the operation command signal MC is input to the torque-command generating unit 56a and the torque-command generating unit 56a generates, based on, for example, a command of braking force included in the operation command signal MC, the requested regenerative torque command PTRS, which is a command of regenerative braking torque that the motor 71 should generate. The requested regenerative torque command PTRS and the suppression amount VDTELM are input to the subtracter 56d and the subtracter 56d calculates a difference between the requested regenerative torque command PTRS and the suppression amount VDTELM and outputs the difference as the regenerative torque command PTR. The regenerative torque command PTR is input to the torque control unit 56e and the torque control unit 56e generates, based on the regenerative torque command PTR, the ON/OFF signal IGC to the inverter circuit 55 such that regenerative torque generated by the motor 71 coincides with the regenerative torque command PTR. In other words, the configuration for controlling the torque of the motor as desired based on the operation command signal MC and the voltage detection value EFCV is explained.

As it is well known by those skilled in the art, the torque of the motor is directly related to the electric current of the motor. Therefore, for example, as shown in FIG. 4(a), it is naturally possible to replace the configuration for controlling the torque explained above with a configuration for controlling the electric current of the motor 71. In other words, the invention can be carried out even if an amount equivalent to the torque is replaced with an amount equivalent to the electric current of the motor 71. In this case, the torque-command generating unit 56a is read as current-command generating unit 56a. Similarly, the requested regenerative torque command PTRS is read as requested regenerative current command PIRS, the regenerative torque command PTR is read as regenerative current command PIR, and the torque control unit 56e is read as current control unit 56e.

Therefore, the suppression amount VDTELM indicating a suppression state of regenerative torque, which is a regeneration state signal, is also an amount indicating a suppression state of regenerative current.

It goes without saying that the configurations explained in the embodiments indicate examples of contents of the present invention and can be combined with another publicly-known technology or a part of the configurations can be changed, for example, omitted without departing from the spirit of the present invention.

INDUSTRIAL APPLICABILITY

As explained above, the present invention can be applied to a propulsion control apparatus for an electric motor car to which a power storage device is applied and, in particular, is useful as an invention that can efficiently perform collection of regenerative power generated during regenerative braking in a power storage apparatus.

REFERENCE SIGNS LIST

1 OVERHEAD WIRE
2 CURRENT COLLECTOR
3 WHEEL
4 RAIL
10 MASTER CONTROLLER
40 CONVERTER APPARATUS
40-1 FIRST CONVERTER APPARATUS
40-2 SECOND CONVERTER APPARATUS
41, 51 REACTORS
42, 52 FILTER CAPACITORS
43a, 43b, 43c, 53a, 53b VOLTAGE DETECTORS
44 CONVERTER CIRCUIT
44H, 44L SWITCHING ELEMENTS
45 SMOOTHING REACTOR
46, 46a CONVERTER CONTROL UNITS
47, 57 CURRENT DETECTORS
50 INVERTER APPARATUS
50-1 FIRST INVERTER APPARATUS
50-2 SECOND INVERTER APPARATUS
54U, 54V, 54W, 54X, 54Y, 54Z SWITCHING ELEMENTS
55 INVERTER CIRCUIT
56 INVERTER CONTROL UNIT
56a TORQUE-COMMAND GENERATING UNIT, CURRENT-COMMAND GENERATING UNIT
56b, 56d SUBTRACTS
56bb NEGATIVE VALUE CUT LIMITER
56c GAIN UNIT
56e TORQUE CONTROL UNIT, CURRENT CONTROL UNIT
60 POWER STORAGE APPARATUS
61 FIRST POWER STORAGE APPARATUS
62 SECOND POWER STORAGE APPARATUS
71 MOTOR
81, 85 MULTIPLIERS
82 CHARGING-CURRENT-COMMAND GENERATING UNIT
82a CHARGING-POWER-COMMAND CALCULATING UNIT
82b CHARGING-CURRENT-COMMAND CALCULATING UNIT
82c PROPORTIONAL INTEGRAL CONTROLLER
83 SELECTING UNIT
84 CURRENT CONTROL UNIT
86 MAXIMUM-DISCHARGING-CURRENT SETTING UNIT
87 LIMITER UNIT
88, 89 DIVIDERS
101 FIRST CAR
102 SECOND CAR
103 THIRD CAR
104 FOURTH CAR
110, 111, 112 ADDERS
113 OR CIRCUIT
114, 115 DIVIDERS
DGC, IGC ON/OFF SIGNALS
EFCD, EFCV FILTER CAPACITOR VOLTAGE DETECTION VALUES
ESD, ESV, ESV1, ESV2 OVERHEAD WIRE VOLTAGES
IB CONVERTER OUTPUT CURRENT
IBM MAXIMUM DISCHARGING CURRENT SETTING VALUE (ALLOWABLE MAXIMUM CURRENT VALUE)
IREF CHARGING AND DISCHARGING CURRENT COMMAND (CHARGING AND DISCHARGING CURRENT COMMAND VALUE)
IREF1 CHARGING CURRENT COMMAND (CHARGING CURRENT COMMAND VALUE)
IREF2 DISCHARGING CURRENT COMMAND (DISCHARGING CURRENT COMMAND VALUE)
IREFMAX DISCHARGING CURRENT UPPER LIMIT VALUE
ISV, ISV1, ISV2 INPUT CURRENTS
MC OPERATION COMMAND SIGNAL
N, NI NEGATIVE SIDE TERMINALS
P, P1 POSITIVE SIDE TERMINALS
P2, N2 DC OUTPUT TERMINALS
PBC, PBC1, PBC2 POWER RUNNING REGENERATION STATE SIGNALS (INVERTER STATE SIGNALS)
PC Requested Regenerative Power
PD REGENERATION ABSORPTION POWER
PLMX POWER RUNNING POWER
PP OVERHEAD WIRE REGENERATIVE POWER
PREF1 CHARGING POWER COMMAND
PSB REGENERATION SUPPRESSION POWER
PTR REGENERATIVE TORQUE COMMAND
PIR REGENERATIVE CURRENT COMMAND
PTRS REQUESTED REGENERATIVE TORQUE COMMAND
PIRS REQUESTED REGENERATIVE CURRENT COMMAND
PV REGENERATIVE POWER
VB CONVERTER OUTPUT VOLTAGE
VC, VC1, VC2 CONTROL SIGNALS
VDL REGENERATION SUPPRESSION START VOLTAGE SETTING VALUE VDTELM, VDTELM1, VDTELM2 REGENERATIVE TORQUE SUPPRESSION AMOUNTS (REGENERATION STATE SIGNALS)

VEL SPEED

The invention claimed is:

1. A propulsion control apparatus for an electric motor car comprising: an inverter apparatus connected to a DC power supply; a motor connected to an output of the inverter apparatus; a converter apparatus connected to an input of the inverter apparatus; and a power storage apparatus connected to an output of the converter apparatus, the propulsion control apparatus for an electric motor car being configured to discharge a part of power running power or regenerative power of the motor from the power storage apparatus or charge a part of the power running power or the regenerative power in the power storage apparatus, wherein the converter apparatus includes a converter control unit that
   i) a generates a charging current command value when a power running regeneration state signal indicates that the inverter apparatus is in a regenerative brake state, wherein the charging current command value is based on a regeneration state signal that is generated based on an input power of the inverter apparatus and that suppresses any one of the regenerative power or regenerative torque equivalent to the regenerative power or regenerative current equivalent to the regenerative power, and
   wherein the charging current command value is a command value of an electric current with which the converter apparatus charges the power storage apparatus,
   ii) generates a current command value of the converter apparatus based on the charging current command value, and
   iii) performs propulsion control, and
when a plurality of sets of the inverter apparatus and the motor are present, the converter control unit generates the charging current command value based on the regeneration state signals of a plurality of the inverter apparatuses.

2. The propulsion control apparatus for an electric motor car according to claim 1, wherein the converter control unit is configured to receive input of an inverter state signal indicating a power running operation state or a regeneration operation state of the inverter apparatus, select any one of the charging current command value and the discharging current command value based on the inerter state signal, and generate the charging and discharging current command value.

3. A propulsion control apparatus for an electric motor car comprising: an inverter apparatus connected to a DC power supply; a motor connected to an output of the inverter apparatus; a converter apparatus connected to an input of the inverter apparatus; and a power storage apparatus connected to an output of the converter apparatus, the propulsion control apparatus for an electric motor car being configured to discharge a part of power running power or regenerative power of the motor from the power storage apparatus or charge a part of the power running power or the regenerative power in the power storage apparatus, wherein the converter apparatus includes a converter control unit that
   i) generates a charging current command value when a power running regeneration state signal indicates that the inverter apparatus is in a regenerative brake state, wherein the charging current command value is based on a regeneration state signal that is generated based on an input power of the inverter apparatus and that suppresses any one of the regenerative power or regenerative torque equivalent to the regenerative power or regenerative current equivalent to the regenerative power, and
   wherein the charging current command value is a command value of an electric current with which the converter apparatus charges the power storage apparatus,
   ii) generates a current command value of the converter apparatus based on the charging current command value, and
   iii) performs propulsion control, and
when a plurality of sets of the converter apparatus and the power storage apparatus are present and a plurality of sets of the inverter apparatus and the motor are present, each of a plurality of the converter control units generates the charging current command value based on the regeneration state signals of a plurality of the inverter apparatuses.

4. A propulsion control apparatus for an electric motor car comprising: an inverter apparatus connected to a DC power supply; a motor connected to an output of the inverter apparatus; a converter apparatus connected to an input of the inverter apparatus; and a power storage apparatus connected to an output of the converter apparatus, the propulsion control apparatus for an electric motor car being configured to charge a part of power running power or regenerative power of the motor in the power storage apparatus or discharge a part of the power running power or the regenerative power from the power storage apparatus, wherein the converter apparatus includes a converter control unit that
   i) generates a discharging current command value when a power running regeneration state signal indicates that the inverter apparatus is in the power running control state, wherein the discharging current command value is based on input power of the inverter apparatus, and
   wherein the discharging current command value is a command value of an electric current with which the converter apparatus discharges the power storage apparatus,
   ii) generates a current command value of the converter apparatus based on the discharging current command value, and
   iii) performs propulsion control.

5. The propulsion control apparatus for an electric motor car according to claim 4, wherein the converter control unit generates a discharging current upper limit value based on input power of the inverter apparatus and generates smaller one of an allowable maximum current value of the power storage apparatus and the discharging current upper limit value as the discharging current command value.

6. The propulsion control apparatus for an electric motor car according to claim 4, wherein, when a plurality of sets of the inverter apparatus and the motor are present, the converter control unit generates the discharging current command value based on a sum of input powers of a plurality of the inverter apparatuses.

7. The propulsion control apparatus for an electric motor car according to claim 4, wherein, when a plurality of sets of the converter apparatus and the power storage apparatus are present, each of a plurality of the converter control units generates the discharging current command value based on a value obtained by averaging input power of the inverter apparatus with a number of the converter apparatuses.

8. The propulsion control apparatus for an electric motor car according to claim 4, wherein, when a plurality of sets of the converter apparatus and the power storage apparatus are present and a plurality of sets of the inverter apparatus and the motor are present, each of a plurality of the converter control units generates the discharging current command value based on a sum of input powers of a plurality of the inverter apparatuses input to the converter control unit.

9. The propulsion control apparatus for an electric motor car according to claim 4, wherein, when a plurality of sets of the converter apparatus and the power storage apparatus are present and a plurality of sets of the inverter apparatus and the motor are present, each of a plurality of the converter control units generates the discharging current command value based on a value obtained by averaging, with a number of the converter apparatuses, a sum of input powers of a plurality of the inverter apparatuses input to the converter control unit.

10. The propulsion control apparatus for an electric motor car according to claim 4, wherein the converter control unit is configured to receive input of an inverter state signal indicating a power running operation state or a regeneration operation state of the inverter apparatus, select any one of the charging current command value and the discharging current command value based on the inerter state signal, and generate the charging and discharging current command value.

11. A propulsion control apparatus for an electric motor car comprising: an inverter apparatus connected to a DC power supply; a motor connected to an output of the inverter apparatus; a converter apparatus connected to an input of the inverter apparatus; and a power storage apparatus connected to an output of the converter apparatus, the propulsion control apparatus for an electric motor car being configured to discharge a part of power running power or regenerative power of the motor from the power storage apparatus or charge a part of the power running power or the regenerative power in the power storage apparatus, wherein the converter apparatus includes a converter control unit that
i) generates a charging current command value when a power running regeneration state signal indicates that the inverter apparatus is in a regenerative brake state, wherein the charging current command value is based on a regeneration state signal that is generated based on an input power of the inverter apparatus and that suppresses any one of the regenerative power or regenerative torque equivalent to the regenerative power or regenerative current equivalent to the regenerative power, a charging current command value and wherein the charging current command value is a command value of an electric current with which the converter apparatus charges the power storage apparatus,
ii) generates a current command value of the converter apparatus based on the charging current command value, and
iii) performs propulsion control.

12. The propulsion control apparatus for an electric motor car according to claim 11, wherein the regeneration state signal is a regenerative power suppression amount, which is an amount with which the inverter apparatus suppresses, from a predetermined value, the regenerative power generated by the motor, a regenerative torque suppression amount, which is an amount with which the inverter apparatus suppresses, from a predetermined value, regenerative torque equivalent to the regenerative power suppression amount, or a regenerative current suppression amount, which is an amount with which the inverter apparatus suppresses, from a predetermined value, regenerative current equivalent to the regenerative power suppression amount.

13. The propulsion control apparatus for an electric motor car according to claim 11, wherein the converter control unit generates the charging current command value based on the regenerative torque suppression amount or the regenerative power suppression amount.

14. The propulsion control apparatus for an electric motor car according to claim 11, wherein the converter control unit generates the regenerative power suppression amount based on a product of the regenerative torque suppression amount and an amount equivalent to a number of revolutions of the motor or speed of the electric motor car and generates the charging current command value based on the regenerative power suppression amount.

15. The propulsion control apparatus for an electric motor car according to claim 11, wherein the converter control unit generates the charging current command value based on a value obtained by amplifying the regeneration state signal.

16. The propulsion control apparatus for an electric motor car according to claim 12, wherein
the converter control unit generates the charging current command value based on a value obtained by amplifying the regeneration state signal, and
the amplified value is set to a value with which charging power to the power storage apparatus is larger than the regenerative power suppression amount.

\* \* \* \* \*